United States Patent
Hofmann et al.

(10) Patent No.: US 10,296,051 B2
(45) Date of Patent: May 21, 2019

(54) DEVICE ASSEMBLY FOR ACCOMODATING AN ELECTRICALLY OPERATED DEVICE

(71) Applicant: ECOM Instruments GmbH, Assamstadt (DE)

(72) Inventors: Dieter Hofmann, Lauda-Koenigshofen (DE); Michael Breitenbach, Bad Mergentheim (DE)

(73) Assignee: ECOM INSTRUMENTS GMBH (DE)

( * ) Notice: Subject to any disclaimer, the term of this patent is extended or adjusted under 35 U.S.C. 154(b) by 0 days.

(21) Appl. No.: 16/005,661

(22) Filed: Jun. 11, 2018

(65) Prior Publication Data
US 2018/0356863 A1 Dec. 13, 2018

(30) Foreign Application Priority Data

Jun. 12, 2017 (DE) .......... 10 2017 209 861

(51) Int. Cl.
*G06F 1/16* (2006.01)
*H01H 3/12* (2006.01)
*H01H 9/04* (2006.01)

(52) U.S. Cl.
CPC .......... *G06F 1/1656* (2013.01); *G06F 1/1626* (2013.01); *G06F 1/1637* (2013.01); *H01H 3/12* (2013.01); *H01H 9/045* (2013.01); *G06F 2200/1633* (2013.01); *H01H 2231/016* (2013.01)

(58) Field of Classification Search
CPC .............................. G06F 1/1626; G06F 1/1656
USPC ............................ 361/679.01, 679.02, 679.3
See application file for complete search history.

(56) References Cited

U.S. PATENT DOCUMENTS

| 9,867,438 B2 | 1/2018 | Balourdet | |
|---|---|---|---|
| 2005/0017947 A1* | 1/2005 | Shahoian | G06F 1/1616 345/156 |
| 2008/0055258 A1 | 3/2008 | Sauers | |
| 2012/0314354 A1* | 12/2012 | Rayner | H01H 13/06 361/679.01 |
| 2018/0070465 A1* | 3/2018 | Cater | G06F 1/1626 |

FOREIGN PATENT DOCUMENTS

| DE | 10200494 A1 | 9/2002 |
|---|---|---|
| DE | 112013004735 T5 | 6/2015 |

OTHER PUBLICATIONS

English abstract for DE-10200494.

* cited by examiner

*Primary Examiner* — Anthony Q Edwards
(74) *Attorney, Agent, or Firm* — Fishman Stewart PLLC

(57) ABSTRACT

A device assembly for accommodating an electrically operated device may include a housing made from a plastic, delimiting a housing interior space, and having a viewing window formed therein that may be closed by a window pane made of a transparent material. The device may include an electrically operated device arranged inside the housing interior space, on the outside of which at least one actuatable control element may be provided. An aperture may be formed in a housing wall in which an actuating element made from an elastic plastic may be arranged at least partially and may be operable by a user of the electrically operated device. The actuating element may be coupled mechanically to the control element such that the control element is operable from outside the housing. An inner housing part made from an elastic plastic may be arranged on an inner side of the housing wall.

20 Claims, 1 Drawing Sheet

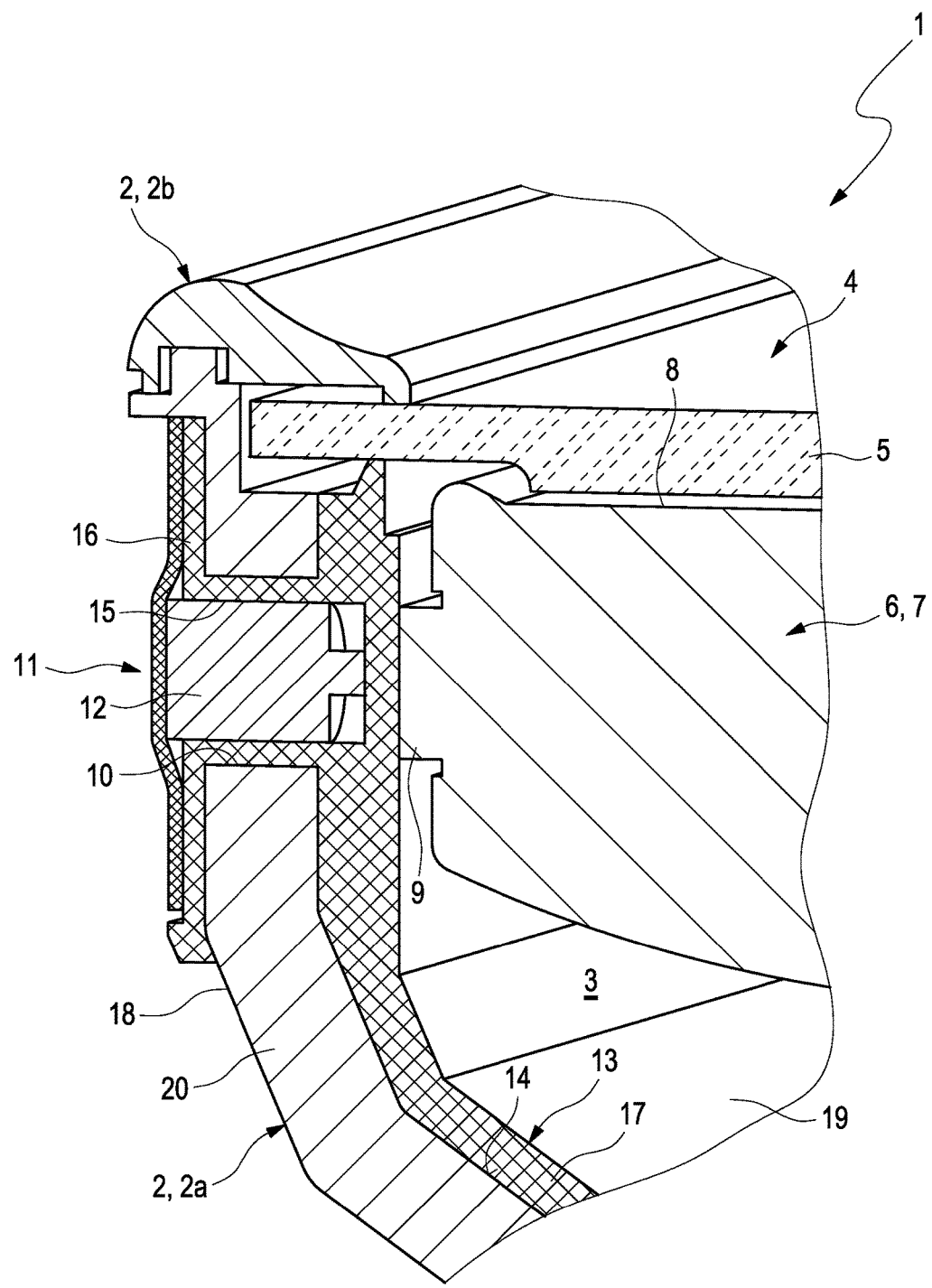

DEVICE ASSEMBLY FOR ACCOMODATING AN ELECTRICALLY OPERATED DEVICE

CROSS-REFERENCE TO RELATED APPLICATIONS

This application claims priority to German Patent Application No. DE 10 2017 209 861.9, dated Jun. 12, 2017, the contents of which are incorporated herein by reference in its entirety.

TECHNICAL FIELD

The present invention relates to a device assembly for accommodating an electrically operated device.

BACKGROUND

In explosion-prone areas, on drilling rigs, for example, the electrical energies applied to external electronic interfaces of an electrically operated device can ignite a gas-air mixture present in an explosion-prone area and thus cause it to explode. This is true most particularly for highly reactive gas mixtures such as mixtures of hydrogen and oxygen, for which said electrical energy is supplied as activation energy to initiate an exothermic reaction forming water from hydrogen and oxygen. A similar situation arises with gas mixtures of acetylene and oxygen.

In this context, it is known to provide pressure-resistant housings in which electrically operated devices can be accommodated if they are to be used in an explosion-prone area. Such conventional housings also serve to protect the device from effects of external shock or impact. However, it has been found to be a drawback of such pressure-resistant housings that control elements present on the electrically operated device, such as a push-button switch or the like, cannot be actuated by the device operator when the electrically operated device is accommodated in the interior space of the housing. A consequence of this may be that the electrical device can only be used for its intended purpose in a limited way, or not at all.

SUMMARY

The present invention therefore addresses the problem of creating a housing for the safe accommodation of an electrically operated device for use in an explosion-prone area, in which a control element present on the device can be actuated conveniently by the device user when the device is accommodated in the pressure-resistant housing.

This problem is solved according to the invention with the subject matter of the independent patent claims. Advantageous variants are the subject matter of the dependent patent claims.

Accordingly, the basic idea of the invention is to route an inner housing part made from a elastic plastic and arranged inside a pressure-resistant constructed housing, functioning as a suspension or damping apparatus for the device arranged inside the housing, out through a aperture in the housing, such that it can also be used as an actuating element to enable a control element provided on the device to be actuated from outside the housing.

The inner housing part made of the elastic plastic also adds to the actual housing, which is constructed mechanically more rigidly and consequently has a significantly lower coefficient of elasticity than the inner housing part. The inner housing part made of the elastic plastic thus functions according to the operating principle of a suspension device or a damping device to attenuate external mechanical shocks or impacts which act from the outside on the housing and are thus also transmitted to the device in the housing interior space.

Thus, the inner housing part made of the elastic plastic cooperates with the actual housing, which is made from a—preferably non-elastic—plastic to create effective protection for the electrically operated device arranged in the housing interior space against damage or even destruction by mechanical shocks or impacts acting on the housing from the outside.

In particular, the electrically operated device may be embedded in the housing interior space via the inner housing part made from the elastic plastic, thereby providing a particularly good protective effect against external mechanical shocks or impacts. The inner housing part preferably bears directly against the electrically operated device, i.e., there is no intermediate space formed between the housing part and the device. Alternatively, however, the inner housing part made of the elastic plastic may also be arranged at a distance from the electrically operated device, such that an intermediate space is formed. In this way, if the electrically operated device is subjected to an external mechanical shock/impact, it is possible to prevent it from being damaged or even destroyed by the effect of the shock or impact.

As a result, the device assembly presented here allows a pressure-resistant encapsulation of an electrically operated device, wherein effective protection from external mechanical shocks/impacts is assured at the same time. In addition, the device assembly according to the invention enables actuation of a control element provided on the device from outside the housing without impairing the leak-proof and pressure-resistant properties of the housing. The device assembly presented here is therefore particularly suitable for use in an explosion-prone area.

A device assembly according to the invention comprises a housing made from a plastic, which delimits a housing interior space and in which a viewing window is formed. The viewing window is closed by a window pane made from a transparent material, preferably glass. If the device is equipped with a display, it may be viewed by the user from the outside through the window pane. This applies particularly if the electrically operated device is a tablet computer.

In the case of the device assembly according to the invention, such an electrically operated device, with at least one actuatable control element provided on the outside thereof, is arranged in the housing interior space. In the present context, the phrase "on the outside of the device" is intended to signify that such a control element is arranged on an outer side of a device housing of the electrically operated device.

An aperture is provided in a housing wall of the housing, in which an actuating element made from an elastic plastic is arranged at least partially and actuatable by a user of the electrically operated device is arranged. The actuating element is coupled mechanically to the control element, such that the control element may be actuated from outside the housing. According to the invention, an inner housing part made from an elastic plastic is arranged on an inner side of the housing wall, wherein the actuating element is formed integrally on this inner housing part.

In order to ensure the pressure-resistant encapsulation essential for operating in an explosion-prone area, such that if a hot gas ignites in the housing interior space it cannot escape to the environment outside the housing by ignition puncture, in a preferred embodiment the actuating element and the aperture are coordinated with each other in such a way that the actuating element arranged in the aperture seals the aperture in a fluid-tight manner.

In a further preferred embodiment, the inner housing part comprises a damping section, which is arranged on an inner side of the housing opposite the viewing window. The damping section of the inner housing parts functions according to the operating principle of a suspension or damping apparatus. Via the damping section the electrically operated device may be protected particularly effectively against the effects of external mechanical shocks or forces.

In a further preferred embodiment, either an intermediate space is formed between the damping section of the housing part and the electrically operated device, or the inner housing part is braced on the electrically operated device without formation of an intermediate space. In the first case, the electrical device is preloaded towards the window pane by the damping section of the inner housing part. If a mechanical impact/shock is exerted from the outside to the housing and consequently to the electrically operated device, thereby deflecting it temporarily from its equilibrium position, the damping section is able to absorb mechanical energy from the device and thus reduce the effect of the impact or shock respectively.

It is possible to achieve particularly effective force transfer from the actuating element to the control element if the inner housing part bears directly against the control element on the inner side.

In a preferred embodiment, a cavity is formed inside the actuating element, in which an actuator body is arranged. The actuator body particularly preferably fills the cavity completely. Via such an actuator body, the transfer of force from the actuating element to the control element may be assured particularly effectively.

It is particularly expedient if the material of the actuator body is not elastically deformable. Alternatively, it may have a coefficient of elasticity lower than the coefficient of elasticity of the actuating element. This means that the actuator body has greater rigidity than the actuating element. This feature, too, ensures that force is transferred effectively from the actuating element to the control element.

In an advantageous further development, the actuating element protrudes to the outside through the aperture and has a radially protruding actuating element collar outside the housing, which collar bears against an outer side of the housing. In this way, any gap present between the actuator body and the housing wall, which delimits the aperture, may be sealed in a fluid-tight manner particularly effectively.

The actuating element collar is expediently fastened to the outer side. The fastening may preferably be in the form of an adhesive bond.

According to another preferred embodiment, the material of the housing part, particularly of the housing wall, has a lower coefficient of elasticity than the material of the inner housing part. With this combination of materials it is possible to protect the device arranged in the housing interior space from external shocks or impacts particularly effectively.

The material of the housing is particularly preferably a non-elastic plastic or comprises a non-elastic plastic. With a housing made from such a material, the requirements of national and international regulations relating to explosion protection are satisfied. Alternatively or additionally, the material of the actuating element, too, may comprise a non-elastic plastic or be a non-elastic plastic. In this manner, it is assured that when the actuating element is actuated, the actuating force exerted by the user is also transferred to the control element in its entirety.

The elastic plastic of the actuating element preferably is or comprises an elastomer. The elastomer particularly preferably is or comprises silicone. Elastomers in general and silicone in particular are commercially available in a wide variety of manufactured forms and may also be obtained inexpensively. This has an advantageous effect on the production costs for the device assembly.

In an advantageous further development, the electrically operated device is a Tablet computer, the display of which is preferably fastened to the viewing window of the housing. With the housing assembly according to the invention, it is thus possible to use a Tablet computer in an operationally safe manner in an explosion-prone area, and to operate it conveniently there as well.

The housing may expediently be constructed in two parts with a first and a second housing part. In this variant, the aperture with the actuating element is arranged in the first housing part and the viewing window in the second housing part.

Further important features and advantages of the invention may be learned from the subordinate claims, the drawing and the associated description of the drawing with reference to the drawing.

Of course, the features described in the preceding text and those to be explained in the following can be used not only in the combination described in each case, but also in other combinations or alone without thereby departing from the scope of the present invention.

Preferred exemplary embodiments of the invention are illustrated in the drawing and will be explained in greater detail in the following description.

BRIEF DESCRIPTION OF DRAWINGS

The single FIGURE shows a partial view of an example of a device assembly 1 according to the invention.

DETAILED DESCRIPTION

Device assembly 1 comprises a housing 2 made from a plastic which delimits a housing interior space 3. A viewing window 4 is provided in housing 2, which is closed by a window pane 5 made from a transparent material, for example a transparent glass. An electrically operated device 6 is arranged in the housing interior space 3. The electrically operated device 6 may be a tablet computer 7 with a touch-sensitive display 8. The electrically operated device 6 is secured to the viewing window 4 of the housing 2 via an adhesive bond. A control element 9, which is operable by a user, is provided on the outside of the tablet computer 7, that is to say on the electrically operated device 6. The control element 9 may serve for example to place the tablet computer 7 in a standby mode, or to "wake" it from such a standby mode. However, such a control element 9 may also serve generally to activate other functions in the tablet computer 7.

As may be seen in the FIGURE, an aperture 10 is formed in a housing wall 20 of housing 2, in which wall an actuating element 11 is arranged, which is operable by a user of the electrically operated device 6. The actuating element 11 is coupled mechanically with the control element 9, such that the control element 9 is operable from outside housing 2 by the user of the electrically operated device 6 or the tablet computer 7 respectively.

As may be seen in the FIGURE, an inner housing part 13 made from an elastic plastic is arranged on an inner side 14 of the housing wall 20. In this arrangement, the actuating element 11 and the inner housing part 13 are formed integrally with each other, and actuating element 11 closes the aperture 10 in a fluid-tight manner. The inner housing part 13 arranged in the housing interior space 3 is positioned with a damping section 17 on an inner side 14 of the housing 2 opposite the viewing window 4. The inner housing part 13 made from the elastic plastic adds to the "outer" housing 2, which is constructed mechanically more rigidly than the inner housing part 13 and therefore has a lower coefficient of elasticity than the inner housing part 13. The inner housing part 13 made of the elastic plastic functions as a suspension and, alternatively or additionally, a damping apparatus when external and consequently mechanical shocks or impacts are applied to the housing 2. The inner housing part 13 bears against the control element 9 on the inside.

As may also be seen in the FIGURE, a cavity 15 is formed in the actuating element 11, in which cavity an actuator body 12 is arranged. The actuator body 12 preferably fills cavity 15 completely. The material of the actuator body 12 is expediently not elastically deformable. Alternatively, the material of the actuator body 12 has a coefficient of elasticity which is lower than the coefficient of elasticity of actuating element 11. Actuating element 11 protrudes to the outside through aperture 10, thereby enabling convenient actuation by the user of the electrically operated device 6. The actuating element 11 has a radially outwardly protruding actuating element collar 16 outside of housing 2, which bears against an outer side 18 of the housing 2. The actuating element collar 16 may be fastened to the outer side 18 of the housing 2 by means of an adhesive bond (not shown).

The inner housing part 13 may be arranged at a distance from the electrically operated device 6, forming an intermediate space 19, as shown in the FIGURE. In a variant which is not shown in the FIGURE, however, the inner housing part 13 may also be braced against the electrically operated device 6 or bear against it without forming an intermediate space 19 respectively (not shown).

The material of housing 2 may also be a non-elastic plastic. The material of the actuating element 11, which is an elastic plastic, is preferably an elastomer such as silicone for example. As indicated in the FIGURE, the housing 2 may be constructed in two parts, with a first housing part 2a and a second housing part 2b. In this case, the aperture 10 is arranged with the actuating element 11 in one of the two housing parts—in the example of the FIGURE in the first housing part 2a. The viewing window 4 with the window pane 5 is arranged in the other housing part—that is to say in the example of the FIG. 1 in the second housing part 2b. The second housing part 2b may be constructed in the manner of a window frame and may be fastened detachably to first housing part 2a, or permanently, that is to say non-detachably, to the second housing part 2b. As an alternative to the two-part configuration of the housing parts 2a, 2b explained above, in an alternative variation thereof a single-part configuration is also conceivable.

If two or more control elements are provided on the electrically operated device 6, in a further development a corresponding number of apertures and actuating elements may also be provided, such that operation of these control elements is possible from outside the housing.

The invention claimed is:

1. A device assembly for accommodating an electrically operated device, comprising a housing made from a plastic, the housing delimiting a housing interior space and having a viewing window formed therein, the viewing window being closed by a window pane made of a transparent material;

an electrically operated device arranged inside the housing interior space, on the outside of which at least one actuatable control element is provided; and an aperture formed in a housing wall of the housing and in which an actuating element made from an elastic plastic is arranged at least partially and is operable by a user of the electrically operated device;

wherein the actuating element is coupled mechanically to the control element such that the control element is operable from outside the housing;

wherein an inner housing part made from an elastic plastic is arranged on an inner side of the housing wall; and wherein the actuating element and the inner housing part are formed integrally with each other.

2. The device assembly according to claim 1, wherein the actuating element closes the aperture in a fluid-tight manner.

3. The device assembly according to claim 1, wherein the inner housing part is arranged together with a damping section on an inner side of the housing opposite the viewing window.

4. The device assembly according to claim 1, wherein one of:

an intermediate space is formed between a damping section of the inner housing part and the electrically operated device, the damping section being arranged on an inner side of the housing opposite the viewing window; or the inner housing part bears directly against the electrically operated device.

5. The device assembly according to claim 1, wherein the inner housing part bears against the control element on the inner side.

6. The device assembly according to claim 1, wherein a cavity is formed in the actuating element, an actuator body being arranged in the cavity.

7. The device assembly according to claim 6, wherein the actuator body completely fills the cavity.

8. The device assembly according to claim 6, wherein a material of the actuator body is not elastically deformable or has a coefficient of elasticity smaller than a coefficient of elasticity of the actuating element.

9. The device assembly according to claim 8, wherein the actuating element extends to the outside through the aperture and has a radially outwardly protruding actuating element collar outside the housing, the collar bearing against the outside of housing.

10. The device assembly according to claim 9, wherein the actuating element collar is fastened to the outer side.

11. The device assembly according to claim 1, wherein a material of the housing part has a lower coefficient of elasticity than a material of the inner housing part.

12. The device assembly according to claim 1, wherein a material of the housing is a non-elastic plastic or includes a non-elastic plastic.

13. The device assembly according to claim 1, wherein the elastic plastic of the actuating element is or includes an elastomer.

14. The device assembly according to claim 1, wherein the electrically operated device is a tablet computer having a display.

15. The device assembly according to claim 1, wherein:

the housing is constructed in two parts, with a first housing part and a second housing part; and the aperture is arranged together with the actuating element in the first housing part and the viewing window is arranged in the second housing part.

16. The device assembly according to claim 1, wherein the transparent material is glass.

17. The device assembly according to claim 10, wherein the actuating element collar is fastened to the outer side via an adhesive bond.

18. The device assembly according to claim 13, wherein the elastomer is silicone.

19. The device assembly according to claim 14, wherein the display is fastened to the viewing window of the housing.

20. A device assembly for accommodating an electrically operated device, comprising a housing made from a plastic, the housing delimiting a housing interior space and having a viewing window formed therein, the viewing window being closed by a window pane made of glass;

an electrically operated device arranged inside the housing interior space, on the outside of which at least one actuatable control element is provided; and an aperture formed in a housing wall of the housing and in which an actuating element made from an elastic plastic is arranged at least partially and is operable by a user of the electrically operated device;

wherein the actuating element is coupled mechanically to the control element such that the control element is operable from outside the housing;

wherein an inner housing part made from an elastic plastic is arranged on an inner side of the housing wall;

wherein the actuating element and the inner housing part are formed integrally with each other;

wherein a cavity is formed in the actuating element, an actuator body being arranged in the cavity and having a material that is not elastically deformable or has a coefficient of elasticity smaller than a coefficient of elasticity of the actuating element.

* * * * *